(12) United States Patent
Kikukawa et al.

(10) Patent No.: US 8,518,514 B2
(45) Date of Patent: Aug. 27, 2013

(54) MULTILAYER OPTICAL RECORDING MEDIUM

(75) Inventors: Takashi Kikukawa, Tokyo (JP); Motohiro Inoue, Tokyo (JP); Atsuko Kosuda, Tokyo (JP); Tomoki Ushida, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/277,465

(22) Filed: Oct. 20, 2011

(65) Prior Publication Data

US 2012/0102510 A1   Apr. 26, 2012

(30) Foreign Application Priority Data

Oct. 21, 2010   (JP) ................................ 2010-236074

(51) Int. Cl.
*G11B 7/24*   (2013.01)

(52) U.S. Cl.
USPC ..................... 428/64.1; 428/64.4; 430/270.11

(58) Field of Classification Search
USPC ....................................................... 428/64.4
See application file for complete search history.

(56) References Cited

U.S. PATENT DOCUMENTS

2011/0206889 A1*   8/2011   Mitsumori et al. .......... 428/64.4

OTHER PUBLICATIONS

Mishima et al., "150 GB, 6-lalyer write once disc for Blue-ray Disc system", Proc of SPIE 6282, 6280I (2006).
Ichimura et al., "Proposal for a multilayer read-only-memory optical disk structure", Applied Optics 45(8):1794-1803 (2006).

* cited by examiner

*Primary Examiner* — Elizabeth Mulvaney
(74) *Attorney, Agent, or Firm* — Porzio, Bromberg & Newman, P.C.

(57) ABSTRACT

Simple design of a multilayer optical recording medium is achieved while suppressing interlayer crosstalk and confocal crosstalk in the multilayer optical recording medium. Simple recording and reading control by a recording and reading unit is also achieved. The multilayer optical recording medium includes at least three or more recording and reading layers deposited one above the other with intermediate layers interposed therebetween, and information can be read by light irradiation from the layers. The intermediate layers have film thicknesses of two types or less, and all the recording and reading layers except the recording and reading layer farthest from a light incident surface have substantially the same optical constant.

7 Claims, 18 Drawing Sheets

| RECORDING LAYER | SINGLE-LAYER REFLECTANCE | STACKED-LAYER REFLECTANCE | SINGLE-LAYER ABSORBANCE | STACKED-LAYER ABSORBANCE |
|---|---|---|---|---|
| L0 | 1.5% | 0.5% | 4.5% | 2.5% |
| L1 | 1.5% | 0.5% | 4.5% | 2.7% |
| L2 | 1.5% | 0.6% | 4.5% | 2.9% |
| L3 | 1.5% | 0.7% | 4.5% | 3.1% |
| L4 | 1.5% | 0.8% | 4.5% | 3.3% |
| L5 | 1.5% | 0.9% | 4.5% | 3.5% |
| L6 | 1.5% | 1.0% | 4.5% | 3.7% |
| L7 | 1.5% | 1.2% | 4.5% | 3.9% |
| L8 | 1.5% | 1.3% | 4.5% | 4.2% |
| L9 | 1.5% | 1.5% | 4.5% | 4.5% |

FIG.3C

| COMPONENT OF STACKED STRUCTURE | FILM THICKNESS OF INTERMEDIATE LAYER (μm) | DISTANCE FROM LIGHT INCIDENT SURFACE (μm) |
|---|---|---|
| L0 RECORDING AND READING LAYER 14A | | 174 |
| FIRST INTERMEDIATE LAYER 16A | 12 | |
| L1 RECORDING AND READING LAYER 14B | | 162 |
| SECOND INTERMEDIATE LAYER 16B | 16 | |
| L2 RECORDING AND READING LAYER 14C | | 146 |
| THIRD INTERMEDIATE LAYER 16C | 12 | |
| L3 RECORDING AND READING LAYER 14D | | 134 |
| FOURTH INTERMEDIATE LAYER 16D | 16 | |
| L4 RECORDING AND READING LAYER 14E | | 118 |
| FIFTH INTERMEDIATE LAYER 16E | 12 | |
| L5 RECORDING AND READING LAYER 14F | | 106 |
| SIXTH INTERMEDIATE LAYER 16F | 16 | |

FIG. 4

| COMPONENT OF STACKED STRUCTURE | FILM THICKNESS OF INTERMEDIATE LAYER (μm) | DISTANCE FROM LIGHT INCIDENT SURFACE (μm) |
|---|---|---|
| L6 RECORDING AND READING LAYER 14G | | 90 |
| SEVENTH INTERMEDIATE LAYER 16G | 12 | |
| L7 RECORDING AND READING LAYER 14H | | 78 |
| EIGHTH INTERMEDIATE LAYER 16H | 16 | |
| L8 RECORDING AND READING LAYER 14I | | 62 |
| NINTH INTERMEDIATE LAYER 16I | 12 | |
| L9 RECORDING AND READING LAYER 14J | | 50 |
| COVER LAYER | 50 | |

FIG. 4 (continued)

| RECORDING LAYER | SINGLE-LAYER REFLECTANCE | STACKED-LAYER REFLECTANCE | SINGLE-LAYER ABSORBANCE | STACKED-LAYER ABSORBANCE |
|---|---|---|---|---|
| L0 | 8.5% | 1.4% | 13.5% | 5.4% |
| L1 | 6.2% | 1.5% | 10.6% | 5.2% |
| L2 | 4.1% | 1.3% | 8.8% | 4.9% |
| L3 | 3.2% | 1.3% | 7.5% | 4.8% |
| L4 | 2.5% | 1.2% | 6.7% | 4.7% |
| L5 | 2.1% | 1.2% | 6.0% | 4.6% |
| L6 | 1.7% | 1.2% | 5.5% | 4.5% |
| L7 | 1.4% | 1.1% | 5.0% | 4.5% |
| L8 | 1.2% | 1.1% | 4.7% | 4.4% |
| L9 | 1.1% | 1.1% | 4.4% | 4.4% |

FIG. 15C

MULTILAYER OPTICAL RECORDING MEDIUM

BACKGROUND OF THE INVENTION

1. Field of the Invention

The present invention relates to a multilayer optical recording medium with a plurality of stacked recording and reading layers from which information can be read by light irradiation.

2. Description of the Related Art

In the field of optical recording media, recording density has been increased by shortening the wavelengths of laser light sources or by increasing the numerical apertures of optical systems. With reference, for example, to optical recording media in accordance with the standards for Blu-ray Disc (BD), recording and reading of the capacity of 25 GB to and from one layer has been allowed by setting the wavelength of laser at 405 nm and the numerical aperture at 0.85. However, efforts by light sources and optical systems have reached their limits. A volumetric recording system in which information is multiply recorded in the direction of an optical axis has been desired in order to increase recording capacity further. By way of example, optical recording media each with eight recording and reading layers (see Non-Patent Literature 1), or with six recording and reading layers (see Non-Patent Literature 2) have been suggested as those in accordance with the standards for Blu-ray Disc (BD).

Multilayer optical recording media may suffer from mixing a signal of other recording and reading layers into a target recording and reading layer, or leakage of noise generated by the effect of other recording and reading layers into a target recording and reading layer, during the reading of information from the target recording and reading layer. Such mixing or leakage problems generally referred to as crosstalk result in degradation of a servo signal or a recording signal.

The crosstalk includes two types including interlayer crosstalk and confocal crosstalk. The interlayer crosstalk is a phenomenon produced by mixing of light reflected off a recording and reading layer next to a recording and reading layer being read with reading light. Accordingly, the interlayer crosstalk is always a matter of concern in multilayer optical recording media with two or more recording and reading layers. The interlayer crosstalk is reduced by increasing an interlayer distance.

The confocal crosstalk is specific to multilayer optical recording media with three or more recording and reading layers. The confocal crosstalk is a phenomenon produced by coincidence in optical path length between primary reading light reflected off a recording and reading layer being read only once, and stray light reflected off a different recording and reading layer a plurality of times.

Principles of generation of the confocal crosstalk are described with reference to FIGS. 11 to 14. In a multilayer optical recording medium 40 shown in FIG. 11, a beam 70 focused on an L0 recording and reading layer 40d for reading or recording is split into a plurality of optical beams due to semi-light-transmitting properties of recording and reading layers. FIG. 12 shows a phenomenon where a beam 71 branching off from a beam targeted for recording and reading to and from an L0 recording and reading layer 40d is reflected off an L1 recording and reading layer 40c and is focused on an L2 recording and reading layer 40b, and the resulting reflected light is detected after being reflected off the L1 recording and reading layer 40c again.

FIG. 13 shows a phenomenon where a beam 72 branching off from a beam targeted for recording and reading to and from an L0 recording and reading layer 40d is reflected off an L2 recording and reading layer 40b and is focused on a light incident surface 40z, and the resulting reflected light is detected after being reflected off the L2 recording and reading layer 40b again. FIG. 14 shows a phenomenon where a beam 73 branching off a beam targeted for recording and reading to and from an L0 recording and reading layer 40d is not focused on a different recording and reading layer, but is detected after being reflected off L1, L3 and L2 recording and reading layers 40c, 40a and 40b in this order.

The light intensity of the beams 71 to 73 as stray light are smaller than that of the beam 70. However, the beams 71 to 73 enter a photodetector with the same optical path length and with the same radius of light flux, generating influential interference. Accordingly, the amount of light received by the photodetector can vary largely in response to the minute change of an interlayer thickness, making it difficult to detect a stable signal. Meanwhile, the amount of stray light determined by the product of the respective reflectances of recording and reading layers decreases as the stray light is reflected a greater number of times. Accordingly, for practical purposes, considering stray light reflected off multiple surfaces three times is sufficient.

In the phenomena shown in FIGS. 11 to 14, the beams 70 and 71 have the same optical path length and the same radius of light flux if T1 is set to be equal to T2. In this case, the beams 70 and 71 enter the photodetector and are detected at the same time. Likewise, the beams 70 and 72 have the same optical path length and the same radius of light flux if the total of T1 and T2 is set to be equal to the total of T3 and TC. Also, the beams 70 and 73 have the same optical path length and the same radius of light flux if T3 is set to be equal to T1. Accordingly, making all interlayer distances different is a generally employed technique to avoid the confocal crosstalk.

Non-Patent Literature 1: Ichimura et. al., Appl. Opt, 45, 1974-1803 (2006), and Non-Patent Literature 2: K. Mishima et al., Proc. of SPIE, 6282, 628201 (2006) are introduced as the Prior Art Document.

As described above, the interlayer crosstalk may be avoided by increasing an interlayer distance. This however makes it difficult to increase the number of stacked recording and reading layers in the range of a limited thickness. Also, the confocal crosstalk may be avoided by making all interlayer distances different while the number of stacked recording and reading layers is increased. This however requires intermediate layers with various film thicknesses, leading to greater interlayer distances. As a result, a distance of a recording and reading layer, which is farthest from a light incident surface, from the light incident surface is increased, thereby causing an adverse effect on a comma aberration due to a tilt and the like.

Furthermore, in some cases, concavities and convexities for tracking control such as grooves and lands should be formed in each recording and reading layer. In these cases, concavities and convexities should be formed in each intermediate layer with a stamper, so that an error is likely to be generated in the film thicknesses of the intermediate layers. The respective intermediate layers may be set to have different film thicknesses in consideration of the effect of such an error generated during film deposition in advance. This however requires setting of a rather large difference between film thicknesses, resulting in more and more greater thickness of a multilayer optical recording medium.

In order to facilitate control by a recording and reading unit, recording and reading layers in a multilayer optical recording medium are generally configured to have the same reflectance determined in a stacked state of the recording and reading layers (that is a reflectance determined by a ratio between incident light and reflected light when each recording and reading layer in the completed multilayer optical recording medium is irradiated with light). Or alternatively, the recording and reading layers are generally configured to be irradiated with laser light having approximate values of laser power applied during recording. In order to achieve these, each of the recording and reading layers should be made of an optimized material, and should have an optimized film structure, an optimized film thickness and the like. This requires the recording and reading unit to set an optimum recording condition (such as recording strategy and the waveform of an irradiation pulse, for example) for each layer. In any case, the conventional idea generates the fear of increased burdens on both a side to manufacture a multilayer optical recording medium and a side to design a recording and reading unit in response to the increase of the number of stacked recording and reading layers.

SUMMARY OF THE INVENTION

The present invention has been made in view of the aforementioned problems. It is an object of the invention to provide a multilayer optical recording medium that can prevent the degradation of a signal quality due to crosstalk and simplify the design of the multilayer optical recording medium when the medium includes multiple recording and reading layers, and further simplify recording and reading control by a recording and reading unit.

The present inventors have conducted intensive study and found that the aforementioned object is realized by the following means.

The invention to achieve the aforementioned object is intended for a multilayer optical recording medium with at least three or more recording and reading layers deposited one above the other with intermediate layers interposed therebetween, wherein information can be read by light irradiation from the layers. In the multilayer optical recording medium, the intermediate layers have film thicknesses of two types or less, and all the recording and reading layers except the recording and reading layer farthest from a light incident surface have substantially the same optical constant.

In association with the above present invention, in the multilayer optical recording medium to achieve the aforementioned object, all the recording and reading layers including the recording and reading layer farthest from the light incident surface have substantially the same optical constant.

In association with the above present invention, in the multilayer optical recording medium to achieve the aforementioned object, the recording and reading layers having substantially the same optical constant have substantially the same material composition and substantially the same film thickness.

In association with the above present invention, in the multilayer optical recording medium to achieve the aforementioned object, the intermediate layers include a first intermediate layer having a first film thickness and a second intermediate layer having a second film thickness greater than the first film thickness, the first and second intermediate layers being alternately deposited one above the other with the recording and reading layer interposed therebetween.

In association with the above present invention, in the multilayer optical recording medium to achieve the aforementioned object, the first and second film thicknesses are approximately 12 μm and approximately 16 μm, respectively.

The present invention achieves simple design of the multilayer optical recording medium while suppressing interlayer crosstalk and confocal crosstalk in the multilayer optical recording medium. The invention also achieves simple recording and reading control by a recording and reading unit.

BRIEF DESCRIPTION OF THE DRAWINGS

FIGS. 3A-3C are respective graphs and a table showing the reflectances and absorbances of the multilayer optical recording medium;

FIG. 4 is a diagram showing the formation of film thicknesses of the multilayer optical recording medium;

FIGS. 15A-15C are respective graphs and table showing the reflectances and absorbances of a multilayer optical recording medium of a reference example.

DETAILED DESCRIPTION OF THE PREFERRED EMBODIMENTS

The principle idea of a multilayer optical recording medium according to an embodiment of the present invention will be described first.

Figure 5:
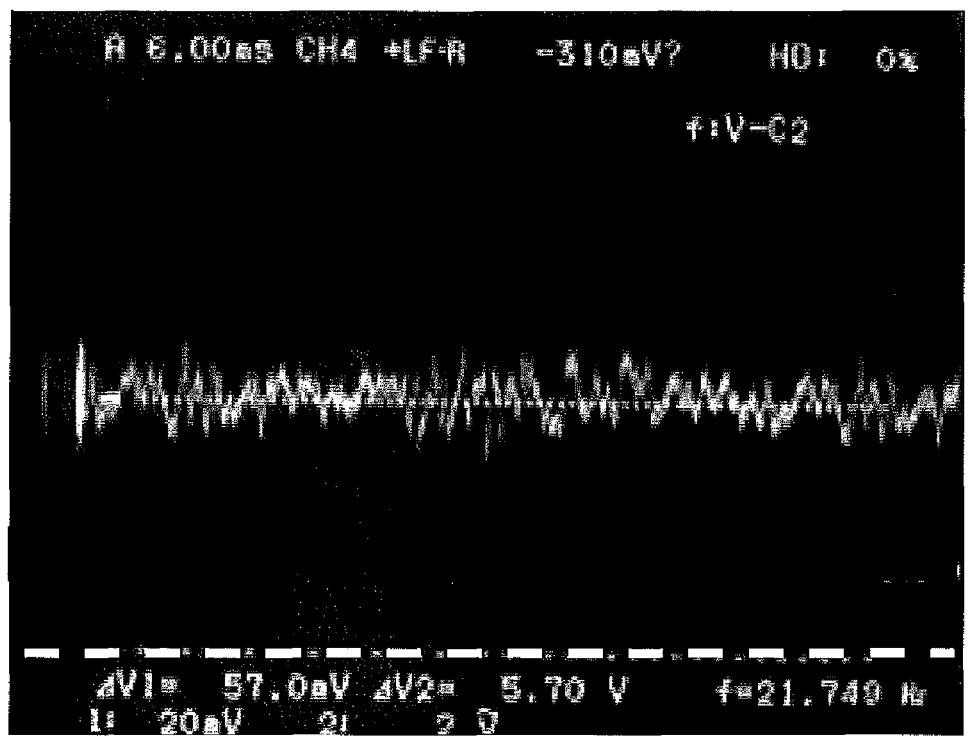
FIG. 5 is a diagram showing the waveform of reflected light generated in response to irradiation of a multilayer optical recording medium according to Example of the present invention with reading light.
Figure 8:
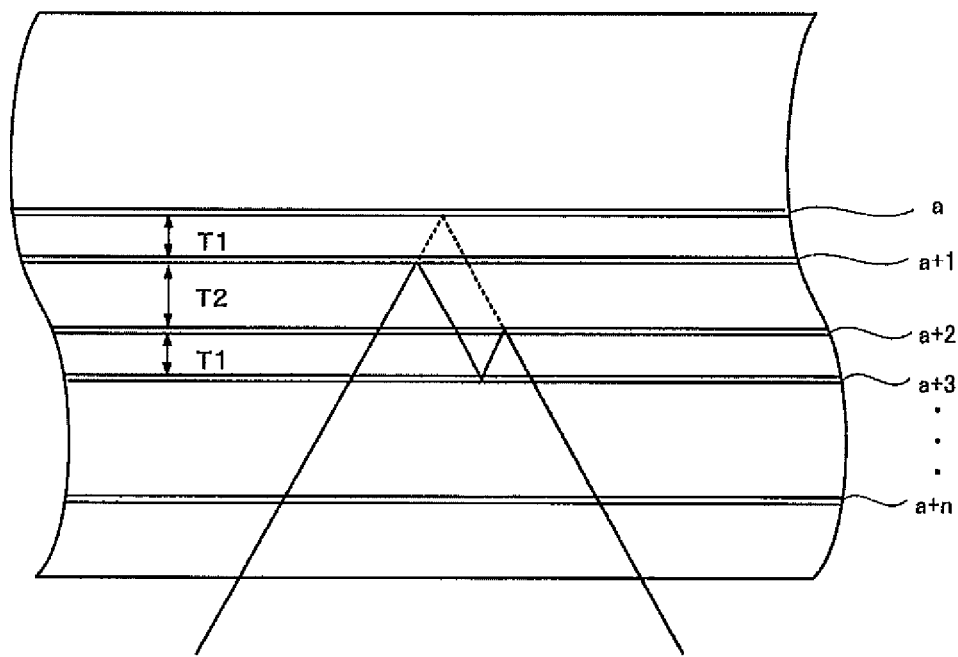
FIG. 8 is a diagram showing the condition of stray light given to explain the principle idea of the multilayer optical recording medium of the present invention.

It is assumed that the multilayer optical recording medium includes intermediate layers disposed between recording and reading layers have two types of thicknesses (T1, T2), and the intermediate layers of the different types are alternately deposited one above the other. FIG. 5 shows the path of reading light (primary light) that is directly reflected off an $a^{th}$ recording and reading layer when the reading is made from the $a^{th}$ recording and reading layer. FIG. 8 shows an exemplary path of stray light having the same optical path length as that of the primary light. Here, regarding a material forming a $k^{th}$ recording and reading layer, the reflectance and transmittance of the $k^{th}$ recording and reading layer as a single layer are defined as $r_k$ and $t_k$ respectively.

$I_a$ and $I_a'$, that are the respective intensities of primary light and stray light determined when reading light having an intensity of "1" enters the $a^{th}$ recording and reading layer, are expressed by the following formulas [1] and [2]:

$$I_a = (t_{a+1} \times t_{a+2} \times t_{a+3} \times \ldots \times t_{a+n})^2 \times r_a \quad [1]$$

$$I_a' = (t_{a+2} \times t_{a+3} \times \ldots \times t_{a+n}) \times r_{a+1} \times t_{a+2} \times r_{a+3} \times r_{a+2} \times (t_{a+3} \times \ldots \times t_{a+n}) = (t_{a+2} \times t_{a+3} \times \ldots \times t_{a+n})^2 \times r_{a+1} \times r_{a+2} \times r_{a+3} \quad [2]$$

Accordingly, the intensity ratio $I_a'/I_a$ between the stray light and the primary light is expressed by the following formula [3]:

$$I_a'/I_a = (t_{a+2} \times t_{a+3} \times \ldots \times t_{a+n})^2 \times r_{a+1} \times r_{a+2} \times r_{a+3}/(t_{a+1} \times t_{a+2} \times t_{a+3} \times \ldots \times t_{a+n})^2 \times r_a = (r_{a+1} \times r_{a+2} \times r_{a+2})/(t_{a+1}^2 \times r_a) \quad [3]$$

In the multilayer optical recording medium in which the intermediate layers of the different thicknesses are alternately disposed one above the other, the effect of confocal crosstalk in the $a^{th}$ recording and reading layer should be reduced, namely the ratio of the intensity of stray light determined by the formula [3] should be reduced. It is seen from the foregoing that such reduction is effectively achieved by the three ideas as follows:

(1) Increase of the reflectance $r_a$ of the $a^{th}$ layer;

(2) Reduction of the reflectances $r_{a+1}, r_{a+2}$ and $r_{a+3}$ of three layers including $(a+1)^{th}$, $(a+2)^{th}$ and $(a+3)^{th}$ layers that are adjacent three layers nearer a light incident surface (front side) than the $a^{th}$ layer; and (3) Increase of the transmittance $t_{a+1}$ of the $(a+1)^{th}$ layer (adjacent to the $a^{th}$ recording and reading layer and nearer the front side than the $a^{th}$ layer).

In order for these ideas to be applicable to all recording and reading layers, all the recording and reading layers except the recording and reading layer that cannot be positioned nearer the front side than the other layers, namely a recording and reading layer farthest from the light incident surface (nearest the back side), can have reduced reflectances and increased transmittances. In terms of design of the medium, this is achieved considerably simply if all the recording and reading layer except the recording and reading layer nearest the back side have the same reflectance r and the same transmittance t that are the reflectance and the transmittance of each of the recording and reading layers as a single layer. In this case, the reflectance r of each of the recording and reading layers is made low, and the transmittance t thereof is made high. The simplest way in terms of design of the medium is certainly that all recording and reading layers including the recording and reading layer nearest the back side have the same reflectance r and the same transmittance t, although this configuration lessens the effect of stray light reduction in the recording and reading layer nearest the back side.

In the multilayer optical recording medium, the reflectance R in a stacked state (hereinafter called stacked-layer reflectance) observed in a recording and reading layer is lower as the recording and reading layer is nearer the back side if different recording and reading layers have the same optical constant, namely the same reflectance r and the same transmittance t. Accordingly, supposing that all recording and reading layers have the same reflectance r and the same transmittance t, the stacked-layer reflectance R decreases monotonously in the order from a recording and reading layer nearer the front side toward a recording and reading layer nearer the back side. A reflectance in a stacked state means a reflectance determined by a ratio between incident light and reflected light generated in response to irradiation of a specific recording and reading layer in the completed multilayer optical recording medium with light.

Forming a plurality of recording and reading layers of the same recording material into the same film thickness is a convenient way in order for the recording and reading layers to have the same optical constant. This reasonably reduces burdens on the manufacture and the design of the medium. In conclusion, in order to achieve the idea and the concept of the multilayer optical recording medium according to the present invention, it is preferable that recording materials forming a plurality of recording and reading layers have the same composition, and that the recording and reading layers have the same film thickness. It is more preferable that all recording and reading layers including a recording and reading layer farthest from the light incident surface have the same optical constant by making all the recording and reading layers have substantially the same material composition and substantially the same film thickness.

It should be noted that substantially the same composition and substantially the same film thickness of recording and reading layers of the multilayer optical recording medium mean that the recording and reading layers have substantially the same result achieved by measuring the film thickness of a test sample with a transmission electron microscope (TEM) or a scanning electron microscope (SEM), with the sample being obtained by cutting a disc in the direction of a cross section with a microtome, and by analyzing the composition of the test sample using an energy dispersive spectroscopy included in either microscope. It may be considered that the recording and reading layers have the same material composition and the same film thickness if this condition is satisfied. In this case, the recording and reading layers certainly have the same optical constant.

A transmittance $t_k$ is higher than 0 and smaller than 1. Accordingly, the intensity of reflected light $I_a$ decreases as the number (n+1) of recording and reading layers increases. An SNR (signal to noise ratio) decreases if the intensity of reflected light $I_a$ is too low to reach the limit of sensitivity of a photodetector in an optical pickup. In principle, the upper limit of the number of recording and reading layers is determined by this limit of sensitivity.

More specifically, in a design stage, recording and reading layers having the same optical constant are sequentially deposited one above the other in the order from the light incident surface toward the back side. The recording and reading layers continue to be deposited one above the other until the number of the stacked recording and reading layers reaches a maximum number at which the stacked-layer reflectance R of a recording and reading layer placed last becomes the limit of sensitivity capable of being handled by the optical pickup.

Figure 9:
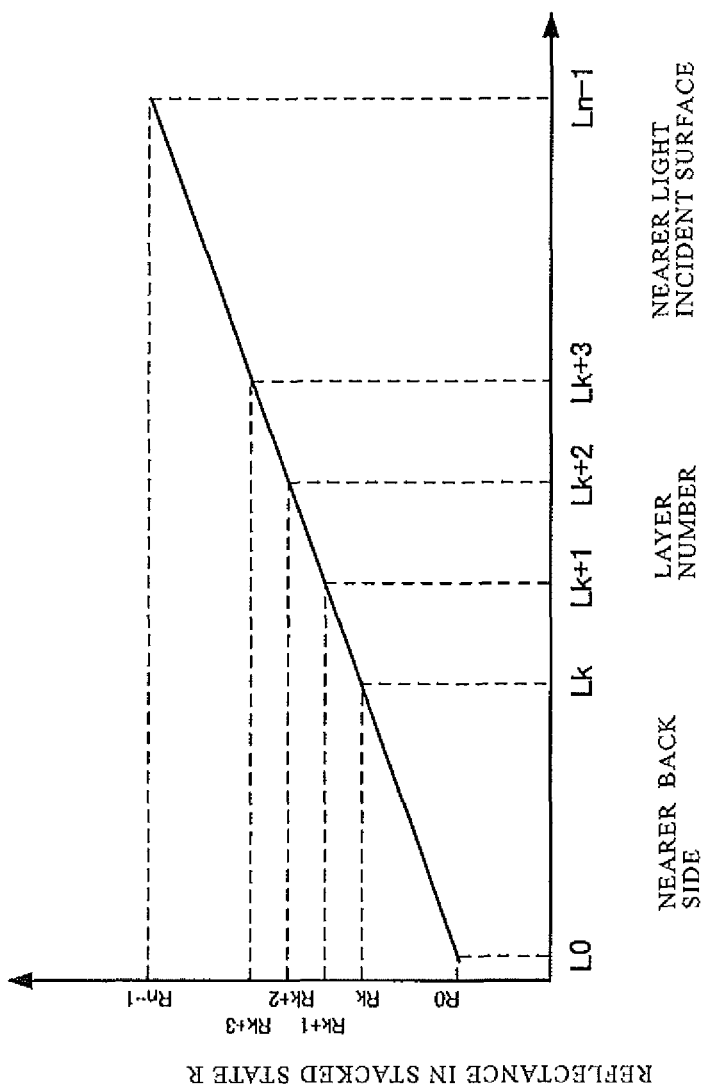
FIG. 9 is a diagram showing the change of a stacked-layer reflectance given to explain the principle idea of the multilayer optical recording medium of the present invention.

FIG. 9 shows an exemplary structure of the multilayer optical recording medium formed on the basis of the aforementioned idea and the concept. The stacked-layer reflectance R decreases monotonously in the order from a recording and reading layer ($L_{n-1}$ layer) nearest the light incident surface toward a recording and reading layer ($L_0$ layer) nearest the back side while recording and reading layers ($L_{k+1}$ layer, $L_k$ layer and $L_{k-1}$ layer) are disposed between the $L_{n-1}$ layer and the $L_0$ layer.

A ratio between the stacked-layer reflectance ($R_{n-1}$) of the recording and reading layer ($L_{n-1}$ layer) nearest the light incident surface and the stacked-layer reflectance ($R_0$) of the recording and reading layer ($L_0$ layer) nearest the back side is determined by the limitation of a dynamic range of the same reflectance that can be handled by a generally employed optical pickup. The aforementioned ratio preferably falls within a ratio of 5:1 and desirably, falls within a ratio of 4:1. To be specific, it is preferable that $R_0/R_{n-1} \geqq 1/5$ be satisfied, and desirable that $R_0/R_{n-1} \geqq 1/4$ be satisfied.

Figure 10:
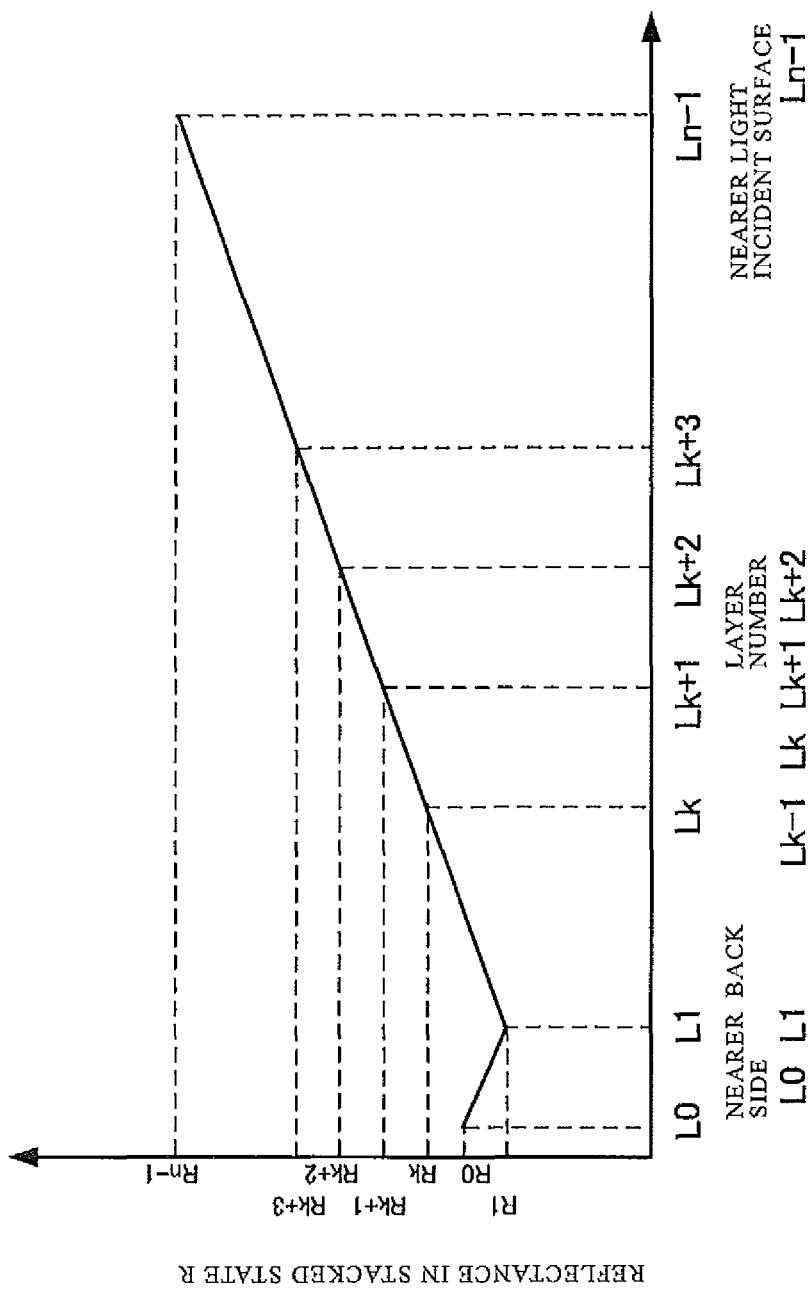
FIG. 10 is a diagram showing the change of a stacked-layer reflectance given to explain the principle idea of the multilayer optical recording medium of the present invention.
Figure 11:
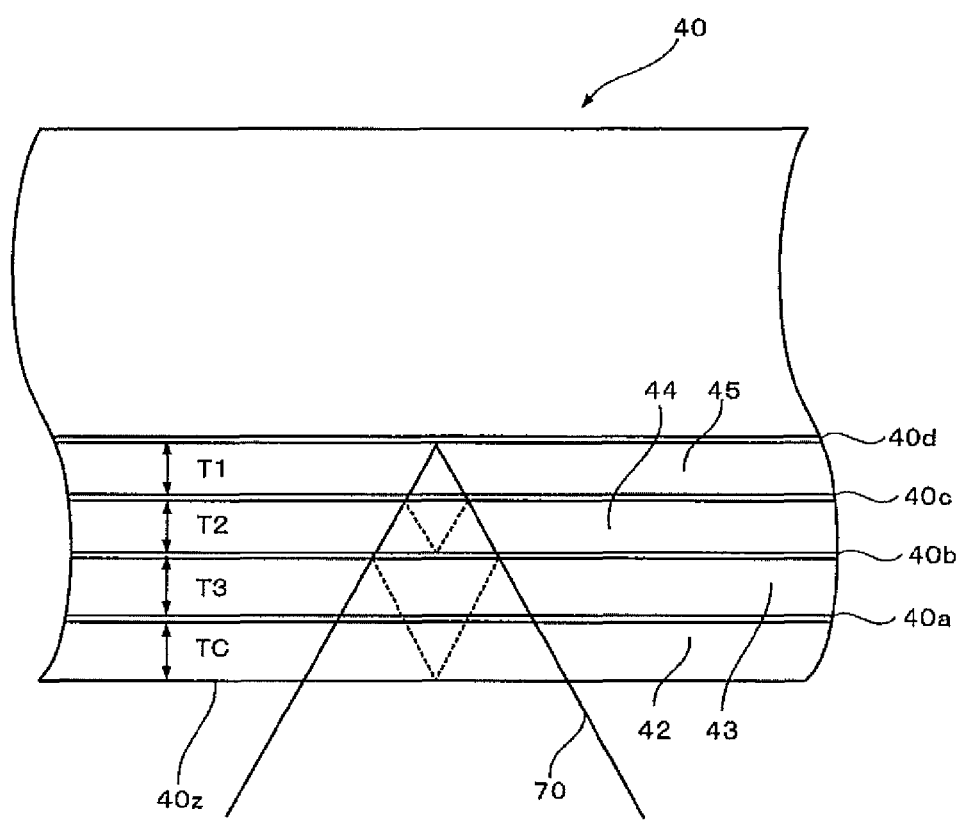
FIG. 11 is a diagram showing the conditions of reading light and stray light in a multilayer optical recording medium.
Figure 12:
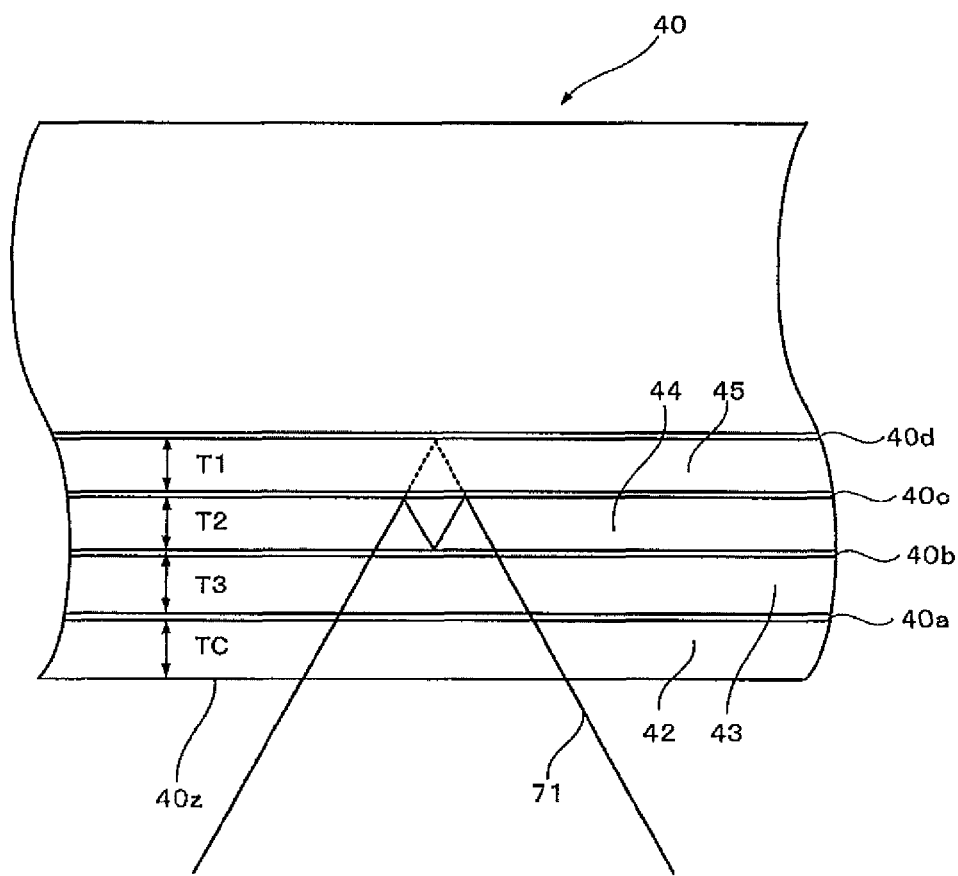
FIG. 12 is a diagram showing the conditions of reading light and stray light in a multilayer optical recording medium.
Figure 13:
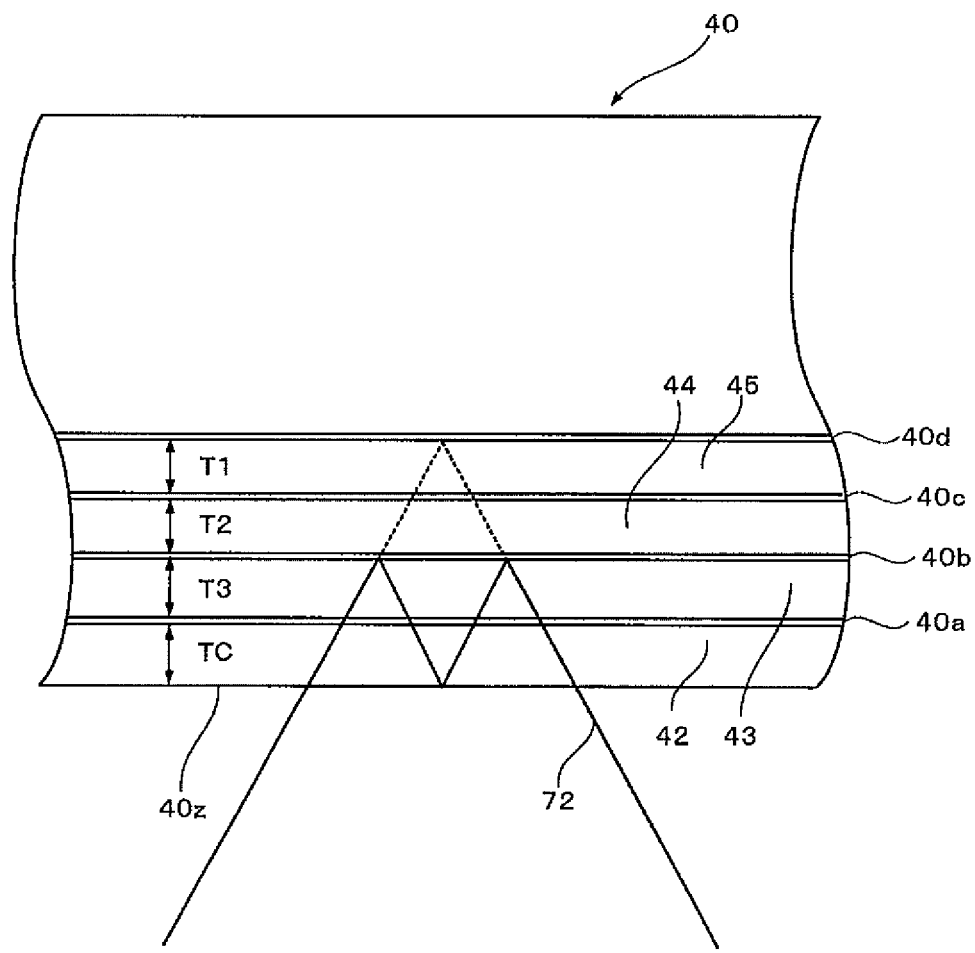
FIG. 13 is a diagram showing the conditions of reading light and stray light in a multilayer optical recording medium.
Figure 14:
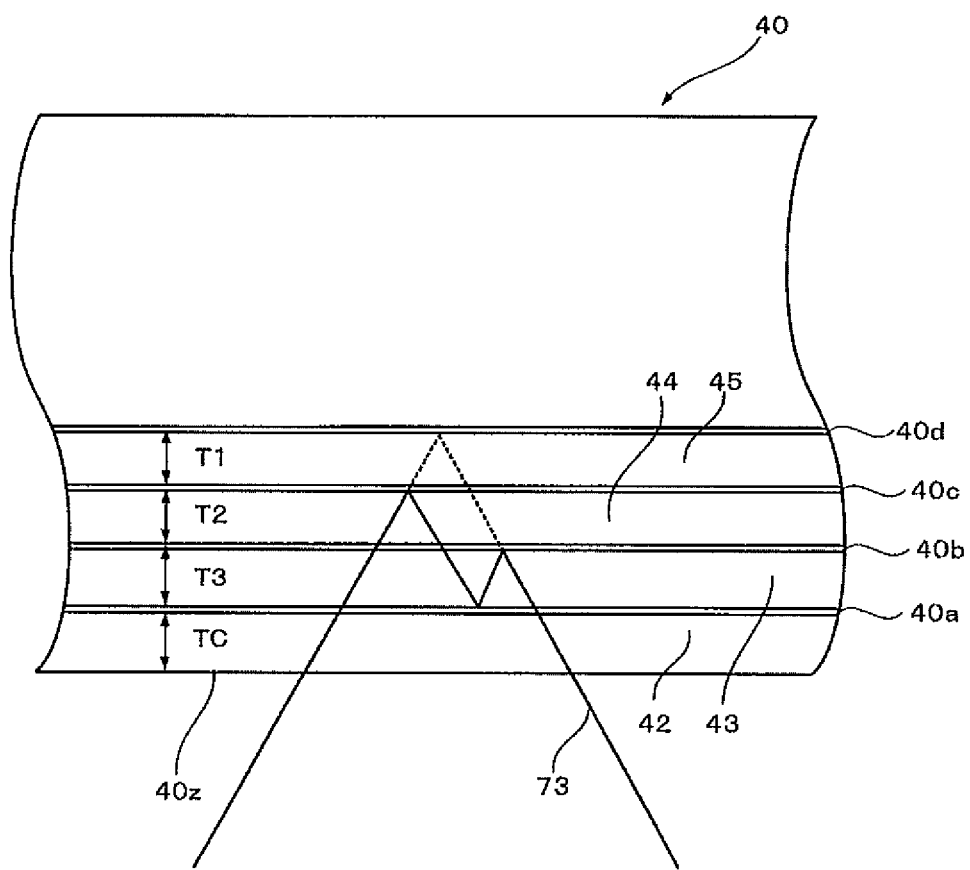
FIG. 14 is a diagram showing the conditions of reading light and stray light in a multilayer optical recording medium.

All the recording and reading layers have the same optical constant according to the idea shown in FIG. 9. Meanwhile, the recording and reading layer ($L_0$ layer) nearest the back side may have a material composition and a film thickness different from those of the other recording and reading layers to have a different optical constant as shown in FIG. 10. This is because there is no need to take the light transmittance of the $L_0$ layer into consideration as no recording and reading layer is placed nearer the back side than the $L_0$ layer.

Embodiments of the present invention will be described below with reference to the accompanying drawings.

Figure 1:
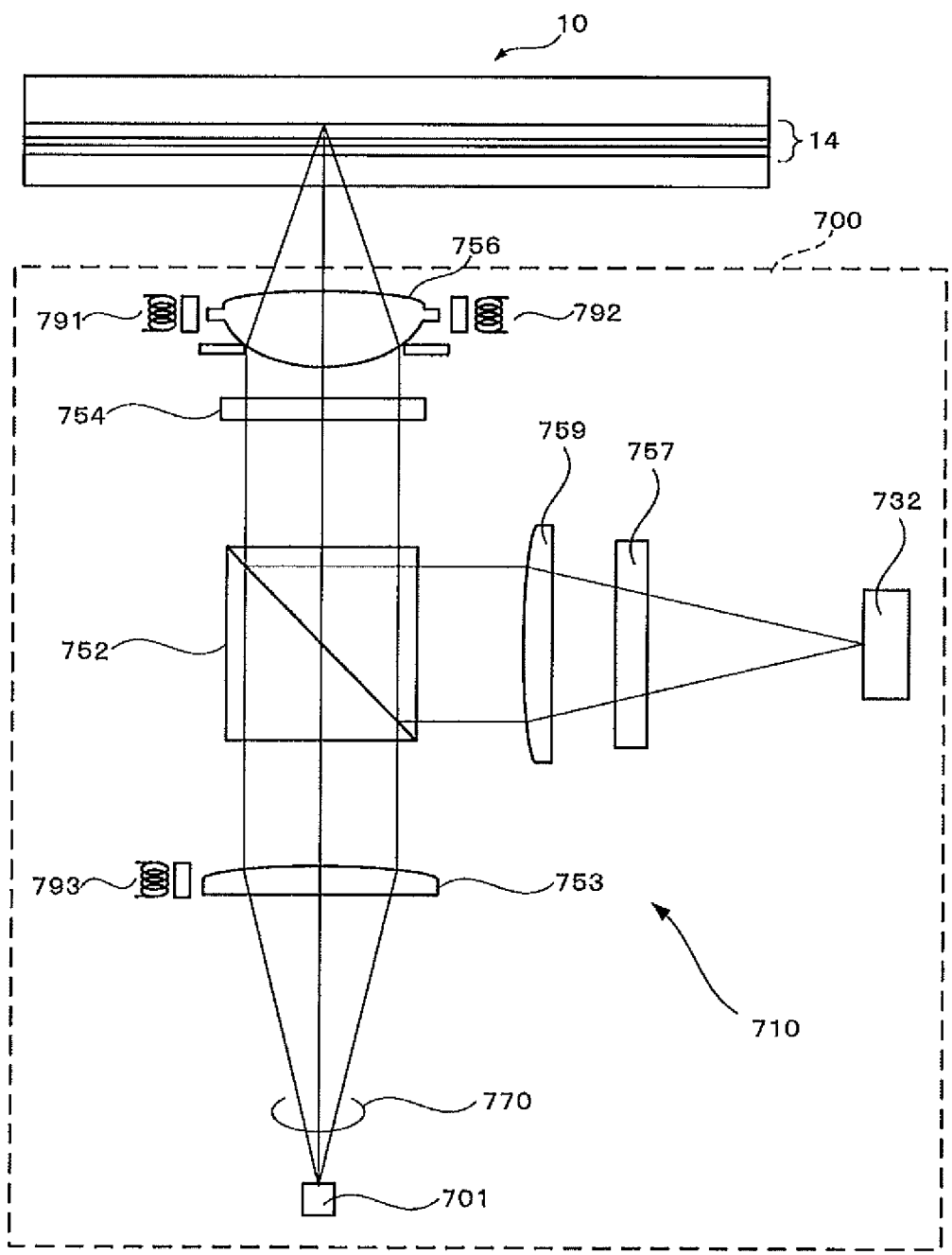
FIG. 1 is a schematic diagram showing the structure of a multilayer optical recording medium according to a first embodiment of the present invention, and that of an optical pickup for recording and reading to and from the multilayer optical recording medium.

FIG. 1 shows the structure of a multilayer optical recording medium 10 according to a first embodiment, and the structure of an optical pickup 700 used for recording and reading to and from the multilayer optical recording medium 10.

The optical pickup 700 includes an optical system 710. The optical system 710 performs recording and reading to and from a recording and reading layer group 14 of the multilayer optical recording medium 10. A diverging beam 770 having a relatively short wavelength of a blue color of from 380 to 450 nm (here, 405 nm) emitted from a light source 701 passes through a collimating lens 753 with spherical aberration correcting means 793, and thereafter enters a polarizing beam splitter 752. The beam 770 having entered the polarizing beam splitter 752 passes through the polarizing beam splitter 752, and thereafter passes through a quarter-wave plate 754 to be converted to circularly polarized light. Next, the beam 770 is converted to a convergent beam by an objective lens 756. The beam 770 is focused on any one of a plurality of recording and reading layers forming the group 14 in the multilayer optical recording medium 10.

The beam 770 reflected off the polarizing beam splitter 752 passes through a condensing lens 759 to be converted to convergent light, and thereafter enters a photodetector 732 through a cylindrical lens 757. The beam 770 is given astigmatism when passing through the cylindrical lens 757. The photodetector 732 includes four light receiving sections not shown each of which output a current signal corresponding to the amount of received light. These current signals are used to generate a focus error (hereinafter called FE) signal based on the astigmatism method, a tracking error (hereinafter called TE) signal based on the push-pull method employed only during reading, a reading signal for reading information recorded in the multilayer optical recording medium 10, and others. The FE and TE signals are subjected to amplification and phase compensation at desirable levels, and are thereafter fed back to actuators 791 and 792 to be used for focus control and tracking control.

Figure 2:
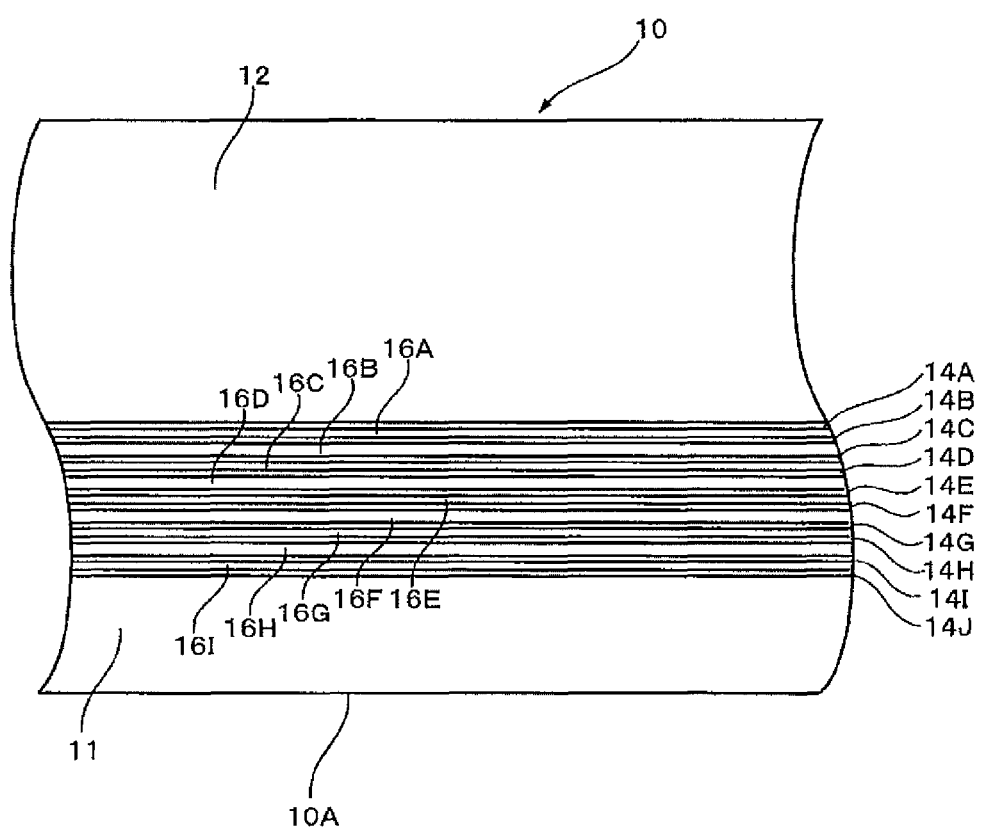
FIG. 2 is a sectional view showing the stacked structure of the multilayer optical recording medium.

FIG. 2 shows the structure in cross section of the multilayer optical recording medium 10 in an enlarged manner.

The multilayer optical recording medium 10 is in the form of a disk having an outer diameter of approximately 120 mm and a thickness of approximately 1.2 mm, and includes three or more recording and reading layers. The multilayer optical recording medium 10 includes a cover layer 11, L0 to L9 recording and reading layers 14A to 14J in a ten-layered structure, a group of intermediate layers 16 interposed between the L0 to L9 recording and reading layers 14A to 14J, and a support substrate 12 in the order as viewed from a light incident surface 10A.

The support substrate 12 is given grooves with a track pitch of 0.32 μm. Various materials such as glass, ceramics and resin are applicable to form the support substrate 12. Of the materials cited, resin is preferred in terms of easiness of molding. Examples of the resin include polycarbonate resins, olefin resins, acrylic resins, epoxy resins, polystyrene resins, polyethylene resins, polypropylene resins, silicone resins, fluorine-based resins, ABS resins, and urethane resins. Of the resins cited, polycarbonate resins and olefin resins are preferred in terms, for example, of easiness of processing. The support substrate 12 is not required to have high light-transmitting properties as it does not form an optical path of the beam 770.

The stacked-layer reflectance of each of the L0 to L9 recording and reading layers 14A to 14J decreases in the order from the light incident surface toward the back side. To be specific, the L9 recording and reading layer 14J nearest the light incident surface has the highest stacked-layer reflectance, and the L0 recording and reading layer 14A has the lowest stacked-layer reflectance.

Film design to achieve the aforementioned stacked-layer reflectance is such that the optical reflectance, absorbance and others of each of the L0 to L9 recording and reading layers 14A to 14J as a single layer are optimized in response to the beam 770 in a wavelength range of a blue color of the optical system 710. In the embodiment, all the L0 to L9 recording and reading layers 14A to 14J have substantially the same optical constant. To achieve this, the L0 to L9 recording and reading layers 14A to 14J have substantially the same material composition and substantially the same film thickness.

Figure 3A:
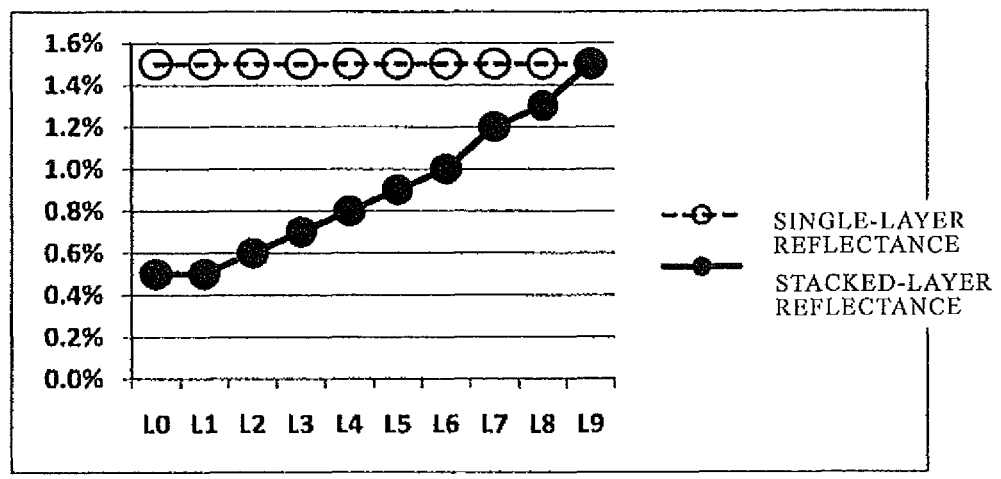
Figure 3B:
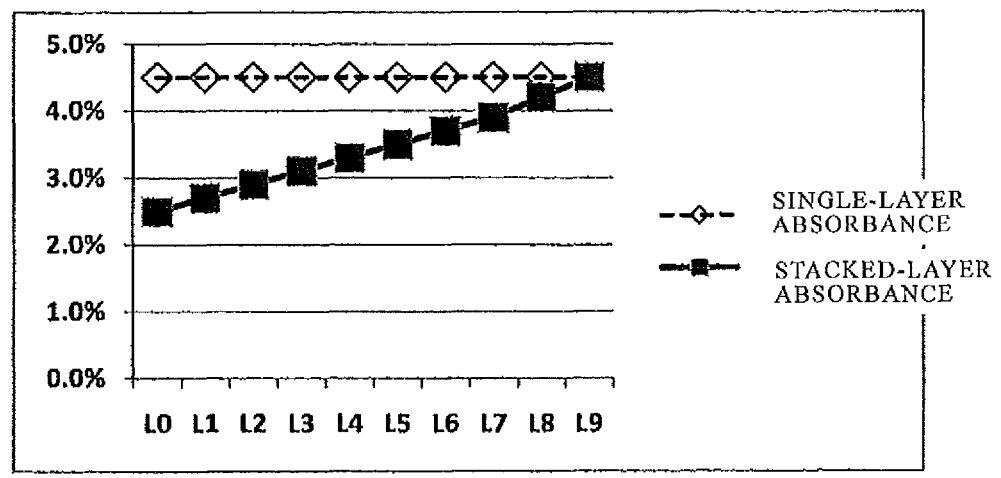

As shown in FIGS. 3A-3C, more specifically, the L0 to L9 recording and reading layers 14A to 14J each have a reflectance of 1.5% that is the reflectance of each of the L0 to L9 recording and reading layers 14A to 14J as a single layer (hereinafter called single-layer reflectance), and have an absorbance of 4.5% that is the absorbance of each of the L0 to L9 recording and reading layers 14A to 14J as a single layer (hereinafter called single-layer absorbance).

As described above, in the present embodiment, the L0 to L9 recording and reading layers 14A to 14J have substantially the same single-layer reflectance and substantially the same single-layer absorbance. This causes the stacked-layer reflectance of each of the L0 to L9 recording and reading layers 14A to 14J to decrease monotonously and sequentially in the order from the light incident surface.

Employing the film design described above makes it possible to form the L0 to L9 recording and reading layers 14A to 14J into substantially the same film thickness by using substantially the same material. This realizes significant reduction of manufacturing cost.

The L0 to L9 recording and reading layers 14A to 14J each have a structure with three to five layers including dielectric films and the like formed on opposite sides of a write-once recording film (not shown). The dielectric films and the like of each of the recording and reading layers have a basic function to protect the write-once recording film. These dielectric films also function to enlarge a difference between optical characteristics before formation of a recording mark and those after the formation, and to enhance recording sensitivity.

If light in large quantities is absorbed in the dielectric films, recording sensitivity is likely to be reduced when irradiated with the beam 770. This is avoided preferably by selecting a material having a low absorption coefficient (k) in a wavelength range of from 380 nm to 450 nm (in particular, 405 nm) to form these dielectric films. The present embodiment uses $TiO_2$ as a material of the dielectric films.

The write-once recording film interposed between the dielectric films is a film in which an irreversible recording mark is formed. Part of the write-once recording film with the recording mark and the other part of the write-once recording film (blank region) have significantly different reflectances to the beam 770, thereby realizing recording and reading of data.

The write-once recording film is formed by using a material containing Bi and O as a principal component. The write-once recording film functions as an inorganic reaction film, and the reflectance thereof largely varies in response to its chemical or physical change caused by the heat of laser light. The principal component of the write-once recording film is preferably Bi—O, or Bi-M-O (M is at least one element selected from Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga and Pb). In the present embodiment, Bi—Ge—O is used as a material of the write-once recording film.

The L0 to L9 recording and reading layers 14A to 14J are shown to have write-once recording films. Meanwhile, phase-change recording films for repeatable recording may also be used. In this case, that phase-change recording films are preferably made of SbTeGe.

As shown in FIG. 4, the intermediate layer group 16 includes first to ninth intermediate layers 16A to 16I provided in this order as viewed from the opposite side of the light incident surface 10A. The first to ninth intermediate layers 16A to 16I are disposed between the L0 to L9 recording and reading layers 14A to 14J. The intermediate layers 16A to 16I are each made of an acrylic or epoxy UV-curable resin. A first distance T1 of 10 μm or more, and a second distance T2 greater than the first distance T1 by 3 μm or more, are alternately set as the thicknesses of the intermediate layers 16A to 16I. More specifically, the first and second distances T1 and T2 preferably have a difference of from 3 μm to 5 μm therebetween, and more preferably, have a difference of 4 μm or more therebetween.

The multilayer optical recording medium 10 employs the first distance T1 of 12 μm, and the second distance T2 of 16 μm. The first to ninth intermediate layers 16A to 16I arranged in this order as viewed from the back side have film thicknesses of 12 μm, 16 μm, 12 μm, 16 μm, 12 μm, 16 μm, 12 μm, 16 μm, and 12 μm, respectively. That is, the intermediate layers of the two film thicknesses (16 μm and 12 μm) are alternately deposited one above the other, and this reduces both interlayer crosstalk and confocal crosstalk as described in more detail later.

Like the intermediate layer group 16, the cover layer 11 is made of a light-transmitting acrylic UV-curable resin, and has a film thickness of 50 μm.

A method of manufacturing the multilayer optical recording medium 10 will next be described. First, the support substrate 12 with grooves and lands formed thereon is formed by injection molding of a polycarbonate resin with a metal stamper. The process of forming the support substrate 12 is not limited to such an injection molding. The support substrate 12 may also be formed by other processes such as the 2P process.

Next, the L0 recording and reading layer 14A is formed on the surface of the support substrate 12 with the grooves and lands formed thereon.

More specifically, a dielectric film, a write-once recording film, and a dielectric film are formed in this order by vapor-phase growth method, which is preferably sputtering. Next, the first intermediate layer 16A is formed on the L0 recording and reading layer 14A. The first intermediate layer 16A is formed, for example, by depositing a UV-curable resin with a controlled viscosity by spin-coating and the like, and then by curing the deposited UV-curable resin by irradiation with an ultraviolet ray. These processes are repeated to form the L1 recording and reading layer 14B, the second intermediate layer 16B, the L2 recording and reading layer 14C, the third intermediate layer 16C, and the other layers that are sequentially deposited in this order one above the other.

After formation of the L9 recording and reading layer 14J, the cover layer 11 is formed on the L9 recording and reading layer 14J to complete the multilayer optical recording medium 10. The cover layer 11 is formed, for example, by depositing an acrylic or epoxy UV-curable resin with a controlled viscosity by spin-coating and the like, and then by curing the deposited UV-curable resin by irradiation with an ultraviolet ray. The manufacturing method of the present invention is not limited to the aforementioned manufacturing method of the first embodiment, but other manufacturing techniques are also applicable.

The action of the multilayer optical recording medium 10 will next be described.

The multilayer optical recording medium 10 includes the L0 to L9 recording and reading layers 14A to 14J the stacked-layer reflectance of each of which decreases in the order from the front side toward the back side. Accordingly, during reading from a specific recording and reading layer, light reflected off an adjacent recording and reading layer nearer the back side than the specific recording and reading layer does not mix with reading light. Thus, crosstalk can be suppressed even if the thicknesses of the intermediate layers are reduced, thereby making it possible to increase the number of the recording and reading layers as many as ten layers including the L0 to L9 recording and reading layers 14A to 14J.

Figure 15A:
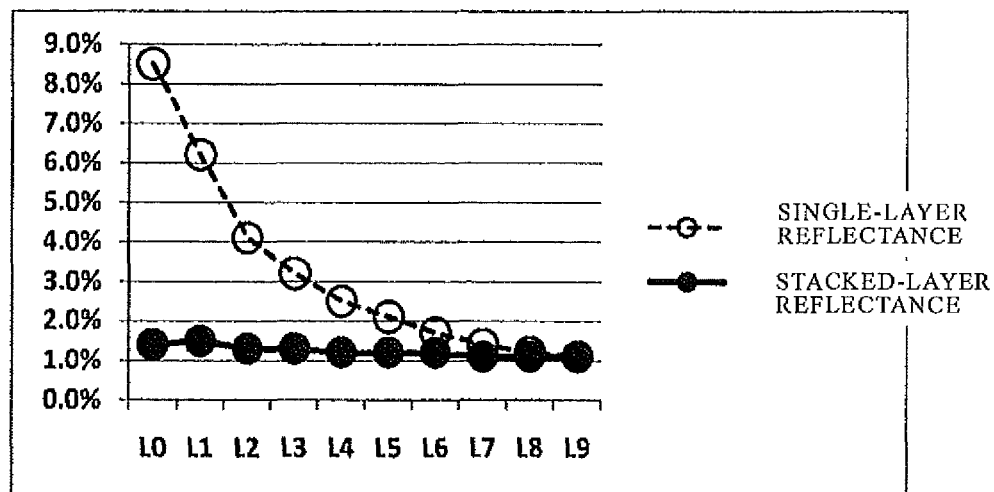
Figure 15B:
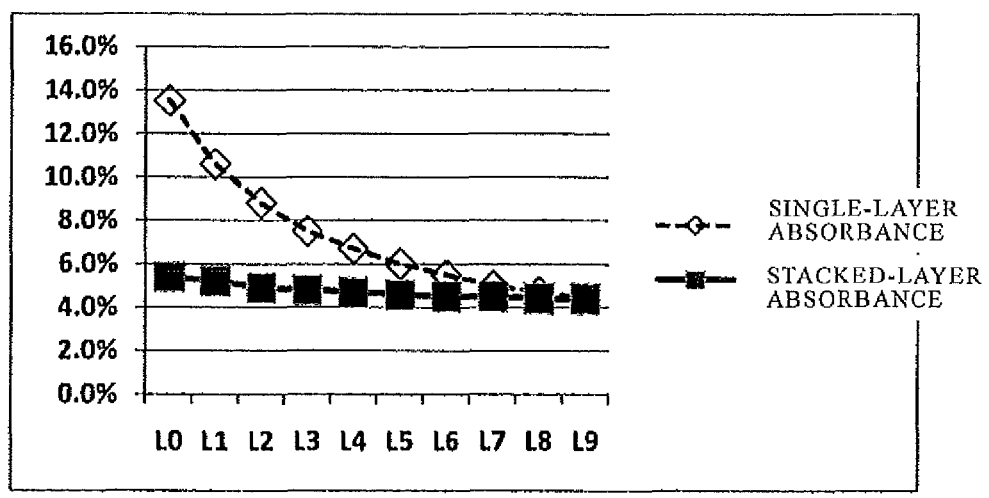

As shown in a reference example of FIGS. 15A-15C, the stacked-layer reflectances of all the L0 to L9 recording and reading layers 14A to 14J may be approximated to about 1.0%. This requires individual settings of the single-layer reflectances and absorbances of the L0 to L9 recording and reading layers 14A to 14J, leading to considerably complicated manufacturing processes. As a result, a manufacturing error becomes influential, so that design to be made should leave room for the error and others, making it difficult to increase the number of stacked layers.

Further, in the present embodiment, the L0 to L9 recording and reading layers 14A to 14J are formed of the same material into the same film thickness. Accordingly, conditions for film deposition are not required to be determined separately for the respective recording and reading layers, allowing significant reduction of a design burden and a manufacturing burden. As a result, the L0 to L9 recording and reading layers 14A to 14J have substantially the same optical constant. This reduces variation in conditions for recording and reading determined by a recording and reading unit, making it possible to simplify recording and reading control (recording strategy). If recording and reading layers of various types having different single-layer reflectances and single-layer absorbances are disposed one above the other in a complicated style, optimum recording and reading control should be found empirically with great difficulty.

In the multilayer optical recording medium 10, intermediate layers of a first film thickness (12 μm) and intermediate layers of a second film thickness (16 μm) which is larger than the first film thickness are alternately disposed one above the other while the respective recording and reading layers 14A to 14J are interposed between the intermediate layers.

By referring to the confocal crosstalk phenomena shown in FIGS. 11 to 14, the amounts of light of the beams 71 to 73 reflected off multiple surfaces are generally smaller than that of the beam 70, for example. Meanwhile, the beams 71 to 73 enter the photodetector with the same optical path length and with the same radius of light flux, generating rather influential interference. Accordingly, the amount of light received by the photodetector varies largely in response to the minute change of an interlayer thickness, making it difficult to detect a stable signal.

A design technique of the multilayer optical recording medium 10 will be described below.

First, a specific condition for film deposition is determined for a recording and reading layer nearest the light incident surface, and recording and reading layers are sequentially deposited one above the other with respect to the light incident surface. When reading power at a level not causing reading degradation is applied to the recording and reading layers, the amount of light returning to the photodetector 732 after being reflected off each recording and reading layer approaches a limit value of handling by an evaluation unit, or a limit value of laser power (i.e., limit value of recording sensitivity) required for formation of a recording mark in a recording and reading layer (alteration of a recording layer) is approached. The number of the aforementioned recording and reading layers to be stacked can be increased to a number by which one of these limit values is approached. The number of stacked layers reaches its upper limit when a recording and reading layer nearest the back side achieves the aforementioned limit values of the reflected light and the recording sensitivity.

If recording and reading layers of the same structure are disposed one above the other, the amount of light returning to the photodetector 732 after being reflected off each of the stacked recording and reading layers naturally decreases monotonously in proportion to the square of the transmittance of the recording and reading layer as the recording and reading layer goes farther to the back side from the light incident surface. Further, laser power reaching each of the recording and reading layers naturally decreases in proportion to the transmittance of the recording and reading layer as the recording and reading layer goes farther to the back side from the light incident surface.

In the multilayer optical recording medium 10, intermediate layers of two film thicknesses of 10 μm or more are alternately used to reduce the effects of the interlayer crosstalk and the confocal crosstalk at the same time.

Example and Comparative Example

The multilayer optical recording medium 10 according to the present embodiment was actually manufactured to examine the recording and reading characteristics thereof. The reflectance, absorbance, and transmittance of each of the L0 to L9 recording and reading layers 14A to 14J as a single layer were set to 1.5%, 4.5%, and 94%, respectively. The recording and reading layers were all formed of the same material composition of $TiO_2/Fe_3O_4/BiO_x$—$GeO_y/SiO_2/TiO_2$ into the same film thickness. The thickness of the substrate was set to 1.1 mm. Further, 12 μm and 16 μm were alternately employed as the thicknesses of the intermediate layers, and the thickness of the cover layer was set to 50 μm.

In order to examine the optical characteristics of the multilayer optical recording medium 10, a reading beam was applied using an optical pickup 90 to the L0 layer (being a recording and reading layer nearest the back side) of the multilayer optical recording medium 10 to evaluate the characteristics of resultant reflected light. The reason therefor is that the effect of the confocal crosstalk becomes most influential in the L0 layer.

Turning to a multilayer optical recording medium given as Comparative Example, respective recording and reading layers were designed in a conventional manner such that the amounts of light reflected off the stacked recording and reading layers and returning to the photodetector 732, and laser power levels reaching the respective recording and reading layers would be substantially the same in the respective recording and reading layers. In Comparative Example, stacked-layer reflectances and stacked-layer absorbances are the same as those shown in FIGS. 15A-15C so that the ten recording and reading layers have the stacked-layer reflectances of around 1%. A reading beam was also applied to the L0 layer (recording and reading layer nearest the back side) in Comparative Example to evaluate the characteristics of resultant reflected light.

Figure 6:
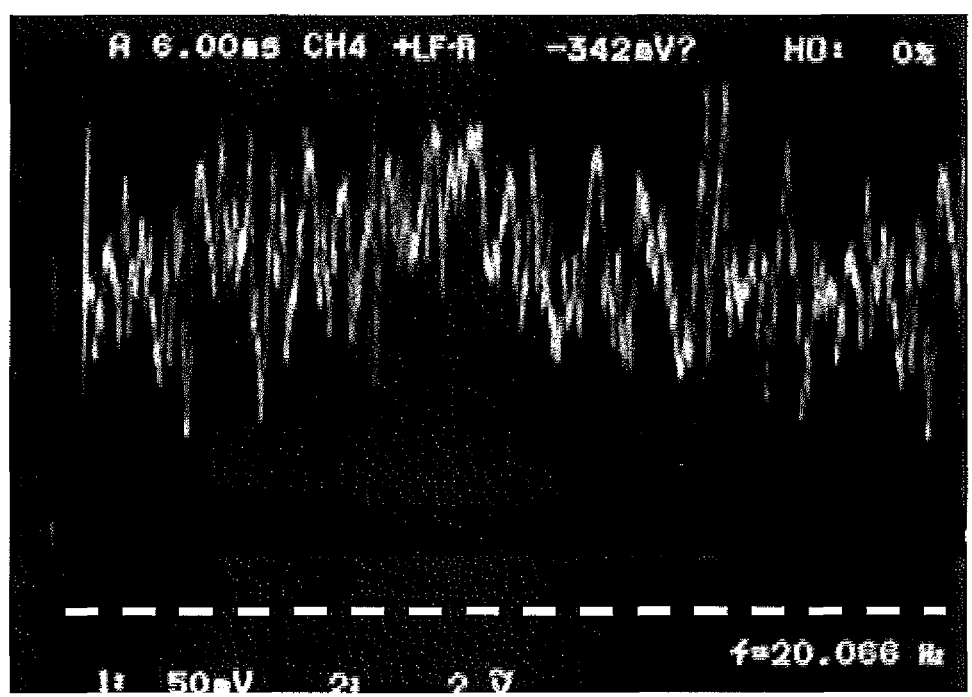
FIG. 6 is a diagram showing the waveform of reflected light generated in response to irradiation of a multilayer optical recording medium according to Comparative Example with respect to the present invention with reading light.
Figure 7:
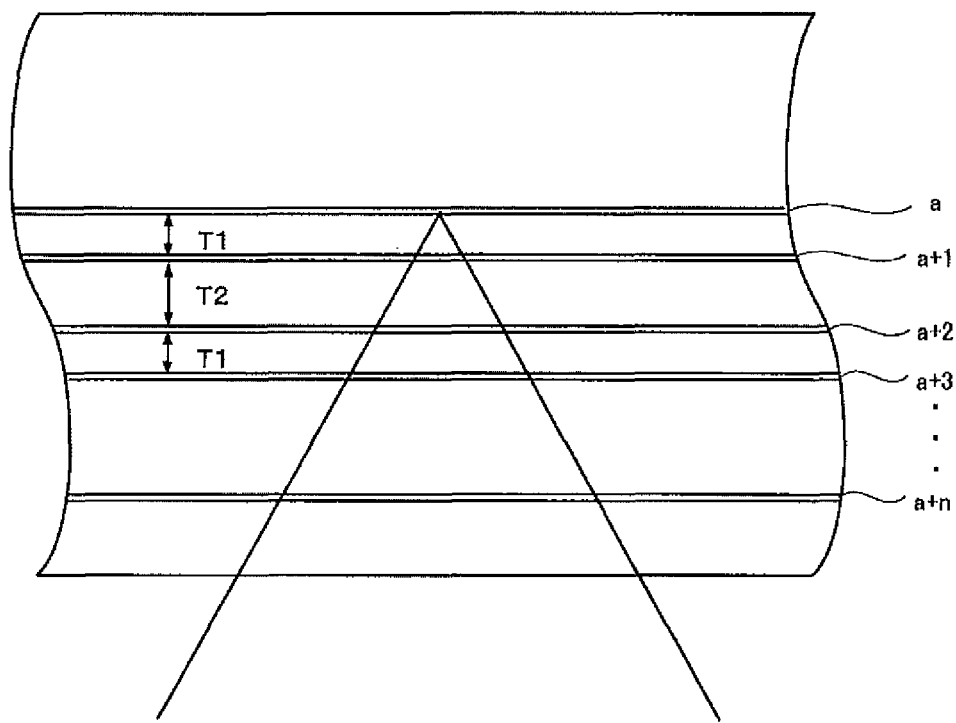
FIG. 7 is a diagram showing the condition of reading light given to explain the principle idea of the multilayer optical recording medium of the present invention.

The photograph of reflected light observed in Example is shown in FIG. 5, and that observed in Comparative Example is shown in FIG. 6.

As seen from the photograph of Comparative Example, significant fluctuations of a reflectance due to the confocal crosstalk are observed as noticeable noises appear in the waveform of the reflected light.

In contrast, it is seen from the photograph of Example that the fluctuations of a reflectance such as those observed in Comparative Example are considerably reduced.

The present embodiment described above includes ten recording and reading layers. However, the present invention is not limited thereto. A burden on designing a structure with three or more recording and reading layers is significantly reduced if the invention is applied to such a structure. In this case, it is preferable that four or more recording and reading layers, and more preferably, five or more recording and reading layers be provided.

The present invention allows increase of the number of stacked recording and reading layers as long as limitations of an evaluation unit such as a range of spherical aberration correction and laser power permit. The invention also allows increase of the number of recording and reading layers to 10 or more depending on the limitations of the evaluation unit.

The present embodiment includes the intermediate layers of two film thicknesses that are alternately disposed one above the other. However, the present invention is not limited thereto. The intermediate layers of the two types may not be placed alternately. Further, the intermediate layers may have the same film thickness as long as the effect of the fluctuations of a reflectance falls within an allowable range of the evaluation unit.

If intermediate layers of two types of film thicknesses are alternately disposed, it is preferable that the intermediate layer nearest the back side always have the greater film thickness. This is because the effect of crosstalk becomes most influential in an intermediate layer nearest the back side.

The multilayer optical recording medium is not limited to those of the embodiments described above. Various modifications are certainly applicable without departing from the gist of the present invention.

The multilayer optical recording medium of the invention is applicable as multilayer optical recording media in accordance with various standards.

The entire disclosure of Japanese Patent Application No. 2010-236074 filed on Oct. 21, 2011 including specification, claims, drawings, and summary are incorporated herein by reference in its entirety.

What is claimed is:

1. A multilayer optical recording medium with at least three or more recording and reading layers deposited one above the other with intermediate layers interposed therebetween, wherein information can be read by light irradiation from the layers,
   wherein the intermediate layers have film thicknesses of two types or less, and
   wherein all the recording and reading layers except the recording and reading layer farthest from a light incident surface have substantially the same optical constant.

2. The multilayer optical recording medium according to claim 1, wherein all the recording and reading layers including the recording and reading layer farthest from the light incident surface have substantially the same optical constant.

3. The multilayer optical recording medium according to claim 1, wherein the recording and reading layers having substantially the same optical constant have substantially the same material composition and substantially the same film thickness.

4. The multilayer optical recording medium according to claim 1, wherein the intermediate layers include a first intermediate layer having a first film thickness and a second intermediate layer having a second film thickness greater than the first film thickness, the first and second intermediate layers being alternately deposited one above the other with the recording and reading layer interposed therebetween.

5. The multilayer optical recording medium according to claim 3, wherein the intermediate layers include a first intermediate layer having a first film thickness and a second intermediate layer having a second film thickness greater than the first film thickness, the first and second intermediate layers being alternately deposited one above the other with the recording and reading layer interposed therebetween.

6. The multilayer optical recording medium according to claim 4, wherein the first and second film thicknesses are approximately 12 µm and approximately 16 µm, respectively.

7. The multilayer optical recording medium according to claim 5, wherein the first and second film thicknesses are approximately 12 µm and approximately 16 µm, respectively.

* * * * *